(12) United States Patent
Call

(10) Patent No.: US 11,507,976 B2
(45) Date of Patent: Nov. 22, 2022

(54) METHOD AND APPARATUS FOR USING A MARKED CORK TO LEAD TO A WEBSITE

(71) Applicant: Brad Call, Freedom, WY (US)

(72) Inventor: Brad Call, Freedom, WY (US)

( * ) Notice: Subject to any disclaimer, the term of this patent is extended or adjusted under 35 U.S.C. 154(b) by 415 days.

(21) Appl. No.: 15/010,794

(22) Filed: Jan. 29, 2016

(65) Prior Publication Data

US 2017/0221097 A1    Aug. 3, 2017

(51) Int. Cl.
*G06Q 30/00*    (2012.01)
*G06Q 30/02*    (2012.01)
*G06F 16/955*   (2019.01)

(52) U.S. Cl.
CPC ..... *G06Q 30/0257* (2013.01); *G06F 16/9554* (2019.01); *G06Q 30/0212* (2013.01)

(58) Field of Classification Search
CPC ............ G06Q 30/0257; G06Q 30/0212; G06F 16/9554
USPC ........................................ 705/14.4
See application file for complete search history.

(56) References Cited

U.S. PATENT DOCUMENTS

| | | | | |
|---|---|---|---|---|
| 2004/0193489 A1* | 9/2004 | Boyd | ................ | G06Q 30/0225 713/176 |
| 2008/0140432 A1* | 6/2008 | Fenn | .................... | G06Q 30/018 705/317 |
| 2014/0339120 A1* | 11/2014 | Key | .......................... | G09F 3/02 493/54 |
| 2016/0027021 A1* | 1/2016 | Kerdemelidis | ...... | G06Q 30/018 705/317 |
| 2017/0349343 A1* | 12/2017 | Wu | ........................ | B65D 51/20 |

FOREIGN PATENT DOCUMENTS

CN    106886808    * 10/2015    ............. G06K 19/06

OTHER PUBLICATIONS

Cuatro Almas by Jessica Sanchez on Jan. 13, 2014 | 3 Minute Read, Madrid based design studio created a label made of stainless steel for Cuatro Almas that conserves the wine at a perfect temperture throughout the time it takes to have a conversation (30 to 60 minutes). (Year: 2014).*

R. Gonçlves et al., "RFID tags on cork stoppers for bottle identification," 2014 IEEE MTT-S International Microwave Symposium (IMS2014), 2014, pp. 1-4, doi: 10.1109/MWSYM.2014.6848458. (Year: 2014).*

* cited by examiner

*Primary Examiner* — Sun M Li

(74) *Attorney, Agent, or Firm* — Michael F. Krieger; Kirton McConkie

(57) ABSTRACT

A cork upon which a password or code is printed which provides access to a website with information about the product.

4 Claims, 1 Drawing Sheet

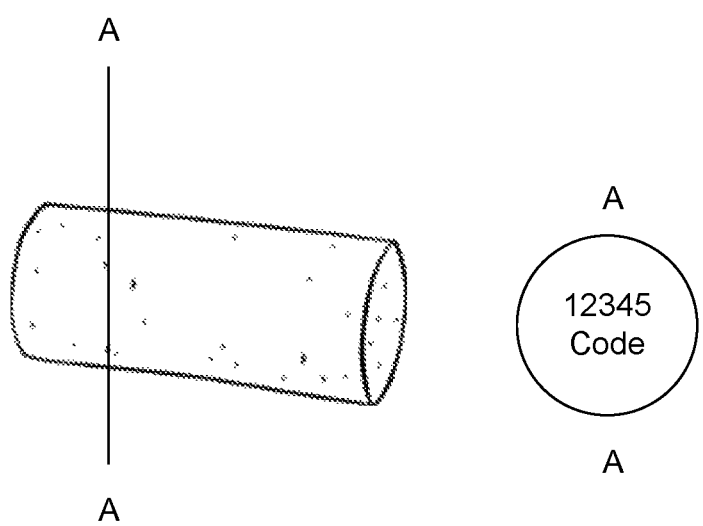

METHOD AND APPARATUS FOR USING A MARKED CORK TO LEAD TO A WEBSITE

CROSS-REFERENCE TO RELATED APPLICATIONS

Not applicable.

BACKGROUND OF THE INVENTION

Although digital links to a website are common, physical incentives for logging on to a website are less common. For example, some billboards have URLs mentioned and many products have URLs so a consumer can learn about a warranty or file a complaint, but those approaches merely provide a website address and do not incentivize a user to visit a website.

BRIEF SUMMARY OF THE INVENTION

A password or symbol such as a bar code or QR code is printed or attached to a portion of a cork which is placed in a bottle so that the symbol or password cannot be viewed without removing the cork. When the cork is removed, the password can be used to access a site located at a URL printed on the bottle or otherwise provided. If a bar code is used, the code is scanned at a point of sale and a prize is given. If a QR code is used, the code is scanned by a QR reader on a smart phone which then opens a website. The website can have information about the contents of the bottle, such as the history of a winery and method of production. Logging on to the website may entitle one to a prize or to entry into a drawing for a prize.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIG. 1 shows a cork with a website password printed at a location that will be hidden when the cork is in the bottle.

DETAILED DESCRIPTION OF THE INVENTION

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

FIG. 1 depicts a cork 10 with a password or bar code or QR code 12 printed on a portion of the cork that is not visible when in the bottle. If the surface of the cork is too rough to accurately print a QR code thereon, the code may be printed on a flat surface and the code and substrate attached to the cork. If a plastic cork or some other smooth material is used, the code may be printed with ink that will not harm the contents of the bottle. The purpose of the code is to direct the consumer to a website. The website has information about the product, its production or other products that may be purchased from the site. It may also provide an opportunity to enter a contest, to receive updates on new products or to invite the consumer to visit the winery.

If a password is printed on the cork, then a website address will need to be provided either on the cork or on the bottle. If a bar code is used, the cork will need to be taken to a retail establishment, preferably the one that sold the bottle, and the bar code can be scanned at the point of sale. A discount or prize can then be given at the store immediately. Additionally, some contests may be configured so that multiple codes within a given time period can increase the chances of winning, for example, by giving 10 entries with 3 corks.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A wine bottle and cork marked for incentivizing a user to visit a website, the bottle and cork comprising:
   a bottle;
   a cork sized to fit the bottle; and
   a bar code printed on a portion of the cork that cannot be viewed when the cork is in the bottle or printed on a flat object attached to a portion of the cork, that cannot be viewed when the cork is in the bottle, wherein the bar code is to direct the consumer to a website, the bar code is used when the cork is taken to a retail establishment, preferably one that sold the bottle, and the bar code is scanned at a point of sale to obtain a discount or prize, and wherein the bar code is scanned by multiple users within a given time period to enable the multiple users get directed to the website, the website providing information about a product, an opportunity to enter and win a contest, and receive updates on new products.

2. The bottle and cork as recited in claim 1, wherein the bar code is printed on the cork or flat object using an ink that will not harm any contents of the bottle.

3. The bottle and cork as recited in claim 1, wherein the bar code is printed on a bottom of the cork that is disposed within the bottle.

4. The bottle and cork as claimed in claim 1, wherein the website further comprises information about contents of the bottle, and method of production.

* * * * *